United States Patent
Eros et al.

[15] 3,652,032
[45] Mar. 28, 1972

[54] SHELF BRACKET

[72] Inventors: Peter S. Eros, Vandalia, and Jerry L. Neubauer, Dayton, both of Ohio

[73] Assignee: General Motors Corporation, Detroit, Mich.

[22] Filed: Mar. 24, 1970

[21] Appl. No.: 22,332

[52] U.S. Cl. ...................................248/235, 248/225; 312/214
[51] Int. Cl. ...............................................A45b 57/04
[58] Field of Search .................... 248/223, 224, 225, 27, 251, 243, 235; 312/214; 339/128; 108/107, 108

[56] References Cited

UNITED STATES PATENTS

| | | | |
|---|---|---|---|
| 3,056,640 | 10/1962 | Squire | 312/214 |
| 3,278,145 | 10/1966 | Leshuk | 248/27 |
| 3,353,143 | 11/1967 | Pauza | 339/128 |
| 3,354,423 | 11/1967 | Garcia | 339/128 |
| 3,378,219 | 4/1968 | Biesecker | 248/251 X |

FOREIGN PATENTS 1,249,599   9/1967   Germany..........................248/223

Primary Examiner—J. Franklin Foss
Attorneys—William S. Pettigrew, Frederick M. Ritchie, and Edward P. Barthel

[57] ABSTRACT

In the preferred form, a refrigerator is provided with a door having an inner door pan of sheet plastic provided with rectangular apertures and horizontal shelves. Each of the shelves is provided with a removable metal shelf front, the ends of which are fastened to brackets of resilient nylon having oppositely facing notches adapted to engage the opposite sides of the rectangular apertures in the inner door pan. Between the oppositely facing notches is provided a resilient U-shaped portion having an extension from one of the notches provided with a knurled surface which can be pressed to disengage the brackets from the door or to insert the inner portion of the bracket into the recess into engagement with the notches for attaching the brackets to the door.

1 Claim, 6 Drawing Figures

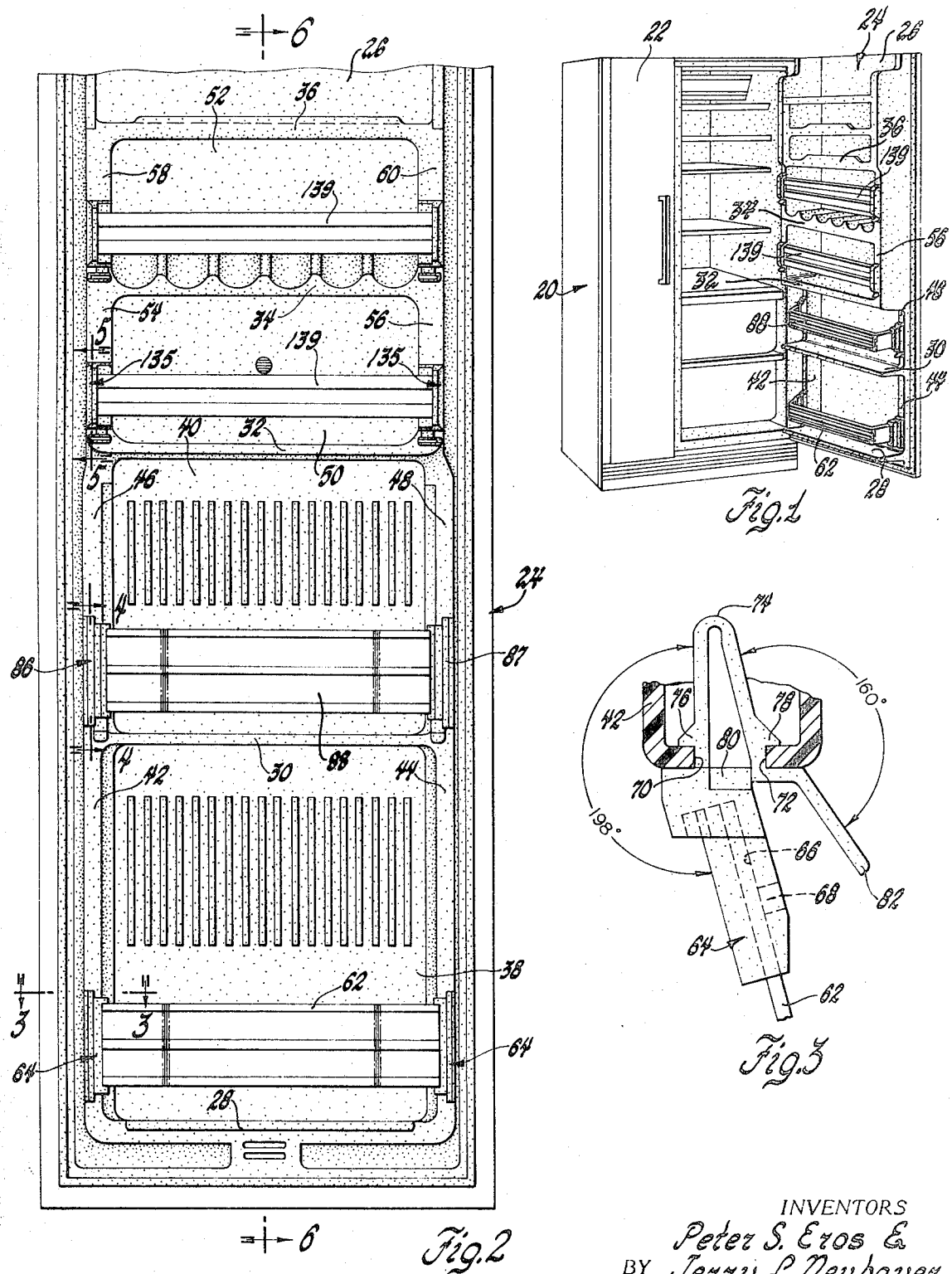

PATENTED MAR 28 1972 3,652,032

INVENTORS
Peter S. Eros &
BY Jerry L. Neubauer

Carl A. Stickel
ATTORNEY

EASILY REMOVED BRACKET

This invention pertains to brackets for attaching to niches or apertured supporting surfaces.

There are many applications in which it is desired to provide a simple bracket which can be readily attached to and detached from a supporting surface by anyone without requiring any tools or skill.

It is an object of this invention to provide a bracket which can be readily attached to and securely retained by a support and also readily removed from the support by a very easy and very natural manipulation without using any tool.

It is another object of this invention to provide a bracket which can be readily attached to a support by a simple push-in and optional squeezing manipulation and which can be readily removed from the support by a simple squeezing and pulling manipulation all without using any tools.

Further objects and advantages of the present invention will be apparent from the following description, reference being had to the accompanying drawings, wherein preferred embodiments of the present invention are clearly shown.

IN THE DRAWINGS

FIG. 1 is a perspective view of a refrigerator with one door open showing shelf fronts connected to brackets attached to the inner door pan embodying several forms of our invention;

FIG. 2 is an enlarged front view of the refrigerator door shown in FIG. 1;

FIG. 3 is an enlarged horizontal sectional view of a portion of the inner door pan and one of the brackets and the adjacent portion of the shelf front illustrating one specific form of bracket embodying our invention;

Figure 4:
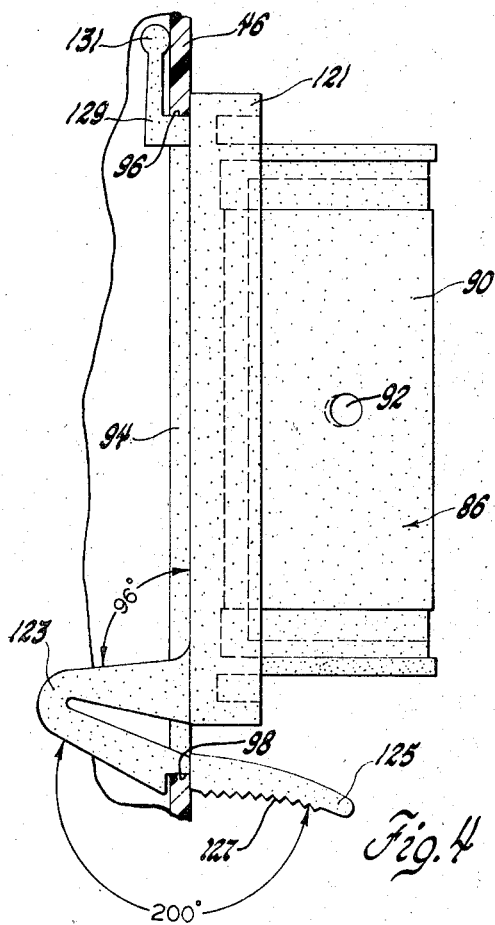
FIG. 4 is a fragmentary enlarged sectional view taken along the line 4–4 of FIG. 2 showing another specific form of bracket embodying a second form of our invention.

Referring now more particularly to FIG. 1, there is shown a refrigerator cabinet 20 having a left front door 22 shown in the closed position and a right front door 24 shown in the open position. This right front door includes an inner door pan or liner 26 formed of a suitable sheet plastic such as acrylic butadiene styrene copolymer or polypropylene which is formed to provide a bottom shelf 28, a second shelf 30, a third shelf 32 and fourth and fifth shelves 34 and 36. Between the shelves 28 and 30 is provided a recess 38 and between the shelves 30 and 32 there is provided a recess 40. Also between the shelves 28, 30 and 32 there are provided protruding side walls 42 and 44 and 46 and 48 along the sides of the recesses 38 and 40. Between the shelves 32 and 34 there is provided a deeper recess 50 and between the shelves 34 and 36 there is provided a second deep recess 52. The recess 50 is provided with side walls 54 and 56 which are substantially flush with the front edges of the shelves 32 and 34. The recess 52 has similar side walls 58 and 60 which are flush with the shelves 34 and 36. The narrow faces of these various side walls is substantially flat.

According to out invention, above the lower shelf 28 there is provided an ornamental metal shelf front 62 having its mid portion extending substantially straight across the recess 38 above the shelf 28. The ends of the shelf front 62 are curved or bent toward the side walls 42 and 44. Attached to these ends of the shelf front 62 are a pair of brackets 64 molded of nylon or polyamide resin. The ends of the metal front 62 are ambeded in the cavity or notch 66 in each of the brackets 64. If desired the shelf front 62 may be further fastened to the brackets 64 by locking pins or screws 68.

As particularly shown in FIG. 3, the bracket 64 is provided with a set of oppositely facing notches 70 and 72. Between these notches 70 and 72 is a resilient U-shaped portion 74 provided with projections 76 and 78 along side the notches 70 and 72. The bracket 64 also has a notch 80 which prevents interference and allows the U-shaped portion to be compressed sufficiently that the projections 76 and 78 can pass through the rectangular opening in the face of the side wall portion 42 as is shown in FIG. 3 until the notches 70 and 72 embrace the opposite edges thereof. This allows the bracket 64 to be fastened to the side wall portion 42 merely by pushing the U-shaped portion 74 through the aperture between the notches 70 and 72 in the side wall portion 42 until the projections 76 and 78 pass through the rectangular opening and the notches 70 and 72 move outwardly to engage the adjacent edge portions of the rectangular opening in the side wall portion 42.

The portion of the bracket 64 receiving the shelf front 62 extends to about an angle of 198° from the U-shaped leg portion to which it is integrally connected. On the opposite side of the U-shaped portion there is an extension 82 extending beyond the notch 72 at an angle of about 160° to the U-shaped leg portion. These portions of the bracket 64 on the opposite sides of the notches 70 and 72 from the U-shaped portion 74 may be made at any conventient angle between 90° and 270°. This angle should be selected for convenience for connection to the shelf front 62 and also for convenience in squeezing the two leg portions of the U-shaped portion 74 together so as to disengage the notches 70 and 72 from the side wall portion 42. While the bracket 64 is shown as applied to an aperture in the face of the side wall 42 it may also be applied to a niche similarly formed in any form of support. The brackets 64 are made in left and right forms to fit the left and right ends of the shelf front 62. The shelf front 62 and the brackets 64 can be attached and removed as a unit.

In FIG. 4 there is shown a bracket 86 embodying a similar principle even through it is differently oriented. The bracket 86 is located at one end of the shelf front 88 which connects at the opposite end to an opposite bracket 87. The bracket 86 has a large generally rectangular portion 90 adapted to fit and to be connected to or fastened to the adjacent end of the shelf front 88. It may be further fastened to the shelf front through the use of a pin or screw 92 in the aperture in the projecting portion 90 which is formed to fit the adjacent end of the shelf front 88. The side wall portion 46 is provided with an elongated vertical rectangular slot 94 in its face which is similar to the rectangular slot provided for the bracket 64. The bracket 86 is provided with an upwardly facing notch 96 which embraces the upper edge of the aperture 94 and a downwardly facing notch 98 which embraces the bottom edge of the slot 94. The bracket 86 is provided with a projecting base portion 121 extending around the projecting portion 90 at the face of the side wall portion 46.

Between the adjacent portion of this base portion 121 and the notch 98 is a resilient U-shaped portion 123, having upper and lower legs. The entire bracket 86 is preferably molded of resilient nylon or polyamide resin to make this U-shaped arm portion resilient. The lower leg of the U-shaped arm portion 123 has an extension 125 extending beyond the notch 98 at an angle of about 200° therefrom provided on its lower face with a knurled or serrated surface 127. The upper leg of the U-shaped arm protion 123 connects with the base portion 121 to form an angle of about 96°.

The upper notch 96 is provided by an L-shaped arm 129 which is spaced away from the base 121 a distance greater than the thickness of the face of the side wall 46 at the edges of the slot 94. The upper end of the arm 129 is provided with a cylindrically shaped edge 131 which projects toward the side wall 46 and the base 121 a sufficient distance to rest against the face of the side wall 46 and to hold the edge portion of the side wall 46 firmly against the base 121. Since the bracket 86 and also the complementary bracket 87 are made of resilient nylon, the arm 129 is sufficiently resilient to move the cylindrical edge 131 toward or away from the base 121 to accommodate variations in the thickness of the material of the side wall 46 around the aperture 94.

The brackets 86 and 87 may be readily inserted through the slot 94 by hooking the arm 129 behind the upper edge of the slot 94 and pressing inwardly the bottom ends so that the U-shaped portion 123 enters the bottom of the slot 94 and is moved until the notch 98 registers with the bottom edge of the aperture 94 to interlock either the bracket 86 or 87 with the side wall 46. The brackets 86 and 87 are removed simply and easily by squeezing the projection 125 until the notch 98 is disengaged from the adjacent edge of the aperture 94 after which the remainder of the brackets 86 and 87 can be removed from the side wall 46. This can be done while the brackets remain attached to the shelf front 88.

Figure 5:
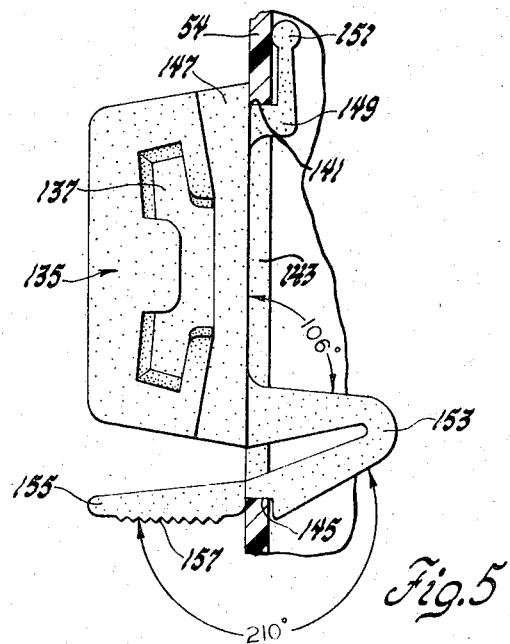
FIG. 5 is a fragmentary enlarged sectional view taken along the line 5–5 in FIG. 2 illustrating a bracket embodying a third form of our invention.
Figure 6:
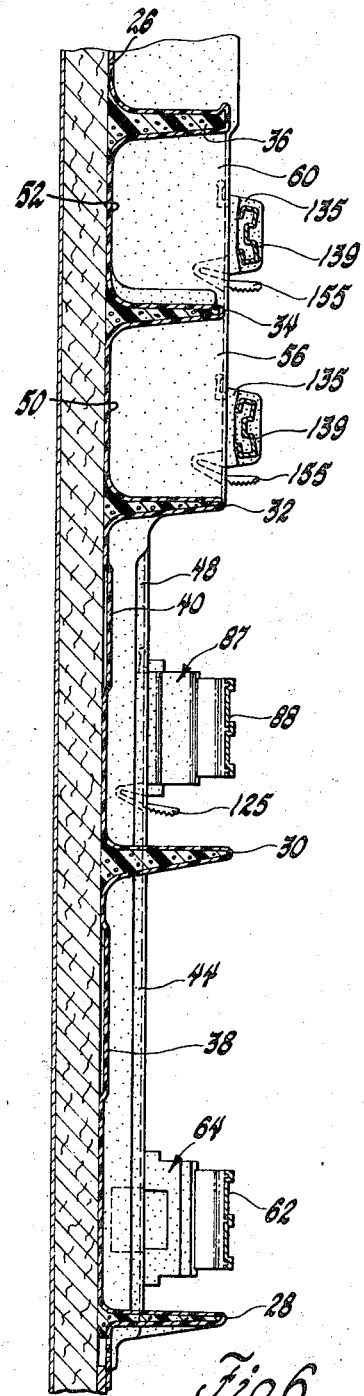
FIG. 6 is a vertical sectional view taken along the line 6–6 of FIG. 2.

In FIG. 5 there is shown a bracket 135 of resilient nylon or polyamide resin which is similar in principle to the bracket 86 as shown in FIG. 4. This bracket 135 has a peculiarly shaped recess 137 adapted to tightly receive the adjacent end of a straight shelf front 139 which may be of spring metal having rearwardly extending square loops adapted to expand slightly within the recess 137 for a tight fit. This bracket 135 has an upwardly facing notch 141 adapted to receive the edge at the top of the rectangular slot or aperture 143 in the face of the side wall 54. The bracket 135 also has a downwardly facing notch 145 adapted to embrace the bottom edge of the rectangular slot 143 in the face of the side wall 54.

The upper portion of the bracket 135 has an edge 147 providing a shoulder which abuts the outer face of the side wall 54. This bracket 135 has an inwardly extending L-shaped arm 149 with an upwardly extending projection spaced from the inner edge of the aperture 143 to form with the shoulder 147 the notch 141 which is wider than the customary thickness of the side wall portion 54 adjacent the upper edge of the aperture 143. At the upper edge, this arm 149 is provided with a cylindrical projection 151 which projects into the theoretical extension of the notch 141 in a manner similar to the projection of the cylindrical notch 131 into the theoretical extension of the notch 96. Through the resilience of the L-shaped arm 149 this projection 151 provides a means of holding the upper edge of the aperture 143 in the side wall 54 sufficiently tight regardless of the normal variations in the thickness of the side wall 54 in this area.

Between the principal portion or base of the bracket 135 and the notch 145 is the resilient U-shaped arm portion 153 having upper and lower legs. The main portion of the bracket makes an angle of about 106° with the adjacent leg on the U-shaped portion 153. The lower leg of the U-shaped arm portion 153 has an extension 155 beyond the notch 145 which can be lifted to release the notch 145 from the lower edge of the slot 143 for removal of the bracket 135 from the side wall 54. The bottom edge of the extension 155 may be knurled or serrated as indicated by the reference character 157. The extension 155 extends beyond the notch 145 at an angle of about 210° from the lower leg of the U-shaped arm portion 153. The bracket 135 may be inserted into the aperture 143 by hooking the arm 149 behind the upper edge of the aperture 143 and pressing the U-shaped arm portion of the aperture 143. The portions connected to the upper and lower legs of the U-shaped arm portion 153 may extend at any convenient angle between 90° and 270°.

The brackets thus described provide a secure support and connection for the shelf fronts 62, 88 and 139 or any other purpose for which a bracket might be used. A niche similar to the apertures in the wall may be used instead of a single aperture wherever desired. The attachment and removal of the brackets are accomplished by very simple and natural manipulation without requiring any tools. Yet, there is little pissibility that the brackets could ever be accidentally loosened or unintentionally removed under any foreseeable circumstances. Furthermore, the brackets may be molded readily and serve a wide variety of used.

While the embodiments of the invention as herein disclosed constitute preferred forms, it is to be understood that other forms might be adopted.

We Claim:

1. The combination with a refrigerator door inner plastic liner having therein spaced protruding side wall portions, each said side wall portion having an elongated vertical rectangular slot in its face, a removable shelf device for attaching to said side wall portions including a shelf front, a pair of integrally molded unitary brackets of resilient polyamide resin material each one of which is fastened at one end of said shelf front, each one of said pair of brackets having a central base with upper and lower sets of inner and outer oppositely facing notch surfaces defining upwardly and downwardly facing notches adapted to engage upper and lower edges of one of the slots, said upper set of notch surfaces forming a wider notch than said lower sets of notch surfaces, said upper set of notch surfaces formed on the upper portion of said bracket base having its inner facing surface providing a shoulder which abuts the outer face of its associated wall, the upper end of each said bracket base having an inwardly extending L-shaped resilient arm including an upwardly extending projection, said L-shaped arm upwardly extending projection adapted to being spaced from the inner edge of its associated slot to form with said bracket base shoulder said upwardly facing notch, both said upwardly and downwardly facing notches defining with their inner and outer oppositely facing surfaces widths greater than the thickness of said wall portions, each one of said pair of brackets having a U-shaped resilient arm including inwardly extending upper and lower legs, said upper leg extending inwardly from the lower end of said bracket base, said lower leg having said downwardly facing notch formed on the underside thereof, said U-shaped arm having an extension on said lower leg extending from said inner facing lower notch surface in a direction between 90° and 270° from said lower leg, said lower leg extension adapted to be pressed for compressing said U-shaped arm thereby releasing said lower set of notched surfaces from the lower edge of its associated slot, the upper end of said L-shaped arm projection having a cylindrically shaped edge thereon for engaging the inner surface of said wall portions so as to tightly hold the upper edges of the slots in said upwardly facing wider notches to thereby accommodate variations in thickness of said side wall portions.

* * * * *

UNITED STATES PATENT OFFICE

CERTIFICATE OF CORRECTION

Patent No. 3,652,032   Dated June 9, 1972

Inventor(s) Peter S. Eros and Jerry L. Neubauer

It is certified that error appears in the above-identified patent and that said Letters Patent are hereby corrected as shown below:

Column 1, the title should be changed to read
-- SHELF BRACKET --;

line 72, "ambeded" should read -- embedded --;

Column 2, line 57, after "U-shaped" insert -- arm --;

Column 3, line 40, "notch" should read -- edge --;

line 60, after "portion" insert -- 153 inwardly until the notch 145 snaps over the bottom edge --.

Signed and sealed this 5th day of September 1972.

(SEAL)
Attest:

EDWARD M. FLETCHER, JR.
Attesting Officer

ROBERT GOTTSCHALK
Commissioner of Patents